United States Patent

Nichols

[15] 3,691,938
[45] Sept. 19, 1972

[54] COOKING APPARATUS

[72] Inventor: James B. Nichols, 45 Roland Park Drive, Huntington, W. Va. 25708

[22] Filed: July 1, 1971

[21] Appl. No.: 158,780

[52] U.S. Cl. ................................ 99/348, 259/122
[51] Int. Cl. ............................................ A47j 37/06
[58] Field of Search........99/348, 352, 364, 371, 388, 99/395, 409; 259/8, 9, 107, 108, 116, 121, 122

[56] References Cited

UNITED STATES PATENTS

| | | | |
|---|---|---|---|
| 1,082,513 | 12/1913 | Gaines | 259/122 |
| 1,471,670 | 10/1923 | Smith | 99/348 X |
| 1,642,531 | 9/1927 | Barnard | 99/348 UX |
| 1,854,732 | 4/1932 | Beran | 259/107 |
| 2,022,384 | 11/1935 | Paffen | 259/122 |
| 2,513,254 | 6/1950 | Savage et al. | 99/348 X |
| 2,850,268 | 9/1958 | Miller et al. | 259/108 X |

*Primary Examiner*—Walter A. Scheel
*Assistant Examiner*—Arthur O. Henderson
*Attorney*—Cushman, Darby & Cushman

[57] ABSTRACT

A cooking appliance particularly for preparation of ground meat containing sauces comprises a vessel having a central rotatable shaft carrying a plurality of vertically spaced horizontal bars which rotate with the shaft and between vertically spaced horizontal stationary bars. A U-shaped member attached to the end of the shaft near the bottom of the vessel follows the contour of the vessel and forms a stirring device.

4 Claims, 5 Drawing Figures

COOKING APPARATUS

The present invention relates to improvements in cooking appliances and has particular application in the commercial preparation of sauces containing granulated meat such as spaghetti sauce. In preparing such sauces in a commercial establishment such as a restaurant, relatively large vessels must be used to produce the desired quantity of sauce. It is desirable to have apparatus capable of cooking such quantities without requiring constant attention by the operator during the cooking period. The present invention provides a cooking apparatus which is essentially free of any manual operation or attention during the cooking period. In addition, the cooking apparatus of the present invention automatically granulates the meat being used in the sauce, whereby the operator can add the meat in ground form in bulk at the beginning of the cooking process and need not expend time in breaking the meat apart into a granulated form and mixing the meat into the sauce. With the apparatus of the present invention, all the ingredients of the final sauce, e.g., ground meat such as ground beef and sausage, spices, onions, tomatoes ect. can be added in bulk to the cooker at the beginning of the cooking period and the operator need not expend time in mixing or granulating the ingredients, and the ingredients are constantly stirred during the cooking period with no attention required by the operator.

Cooking apparatus having a vertical centered shaft with a curved dasher element engaging the bottom wall of the cooking vessel is disclosed in U.S. Pat. No. 960,105, issued May 31, 1910. In addition, the shaft carries a plurality of horizontal, vertically spaced blades which alternate with horizontal, vertically spaced heating coils. However, the apparatus U.S. Pat. No. 960,105 is cumbersome and difficult to disassemble and rassemble for cleaning purposes.

In accordance with the present invention, an easily disassembled cooking appliance is provided which cooks meat containing sauces with a minimum of attention by the operator and automatically granulates ground meat in the sauce during the cooking period. The appliance has means for continuously mixing the sauce during the cooking process in a manner whereby the sauce is kept at an evenly distributed temperature, and burning and sticking of the sauce on the bottom and side walls of the cooking vessel is prevented.

The cooking appliance of the present invention comprises a cooking vessel having cylindrical side walls, a removable top closure, an integral bottom section, a rotatable shaft removably fixed at one end to drive means mounted on the top closure and extending coaxial to the side walls of the vessel to near the bottom of the vessel. A horizontal bar is attached to the rotatable shaft on the end of the shaft near the bottom of the vessel. The horizontal bar extends radially from the shaft in near proximity of the bottom of the vessel to the near proximity of the side wall of the vessel. Both end portions of the horizontal bar are bent into upright extensions which are parallel and in near proximity of the side walls of the vessel. A series of hub elements are stacked one upon the other in coaxial arrangement with the rotatable shaft. At least one horizontal mixing bar or the like is attached to each of the hub elements and extends radially outward toward the side walls of the vessel. The hubs and horizontal mixing elements attached thereto have means associated therewith whereby alternating hubs and horizontal elements along the rotating shaft rotate with the shaft, while the remaining hubs and horizontal elements are restrained from rotating with the shaft. The differential movement between the alternating horizontal elements efficiently mixes the sauce being cooked in the cooking vessel and further granulates the ground meat component of the sauce.

The hub elements, as mentioned above, have at least one horizontal element attached thereto extending radially from the hub element. The number of horizontal elements attached to the hub elements is preferably from one to four. In a particularly preferred mode, there are two horizontal elements attached to each hub element which extend radially from the hub in opposite directions. In the preferred mode, the hub elements that are to rotate with the rotatable shaft have square openings therein which match the square shape of the rotatable shaft. The non-rotating hubs have round openings which are large enough that the rotatable shaft can turn freely therein.

The horizontal mixing elements which are connected to the non-rotating hubs are longer than the horizontal elements connected to the rotating hubs. At least one vertical elongated member is attached to the top closure of the cooking apparatus and located at a point or points where the end portion of the longer horizontal elements come into contact with the elongated member and are thus restrained from further rotation. The shorter horizontal members clear the elongated, vertical member and are, thus, free to rotate.

The longer horizontal elements are of such a length that the rotating upright portion of the horizontal bar attached to the bottom of the rotating shaft clears the ends of the horizontal elements. The upright portions of the horizontal bar rotate in near proximity of the side walls of the cooking vessel thereby preventing sticking and burning on the walls of the vessel.

An illustrative embodiment of the present invention will be more fully described with reference to the following drawings in which.

Figure 1:
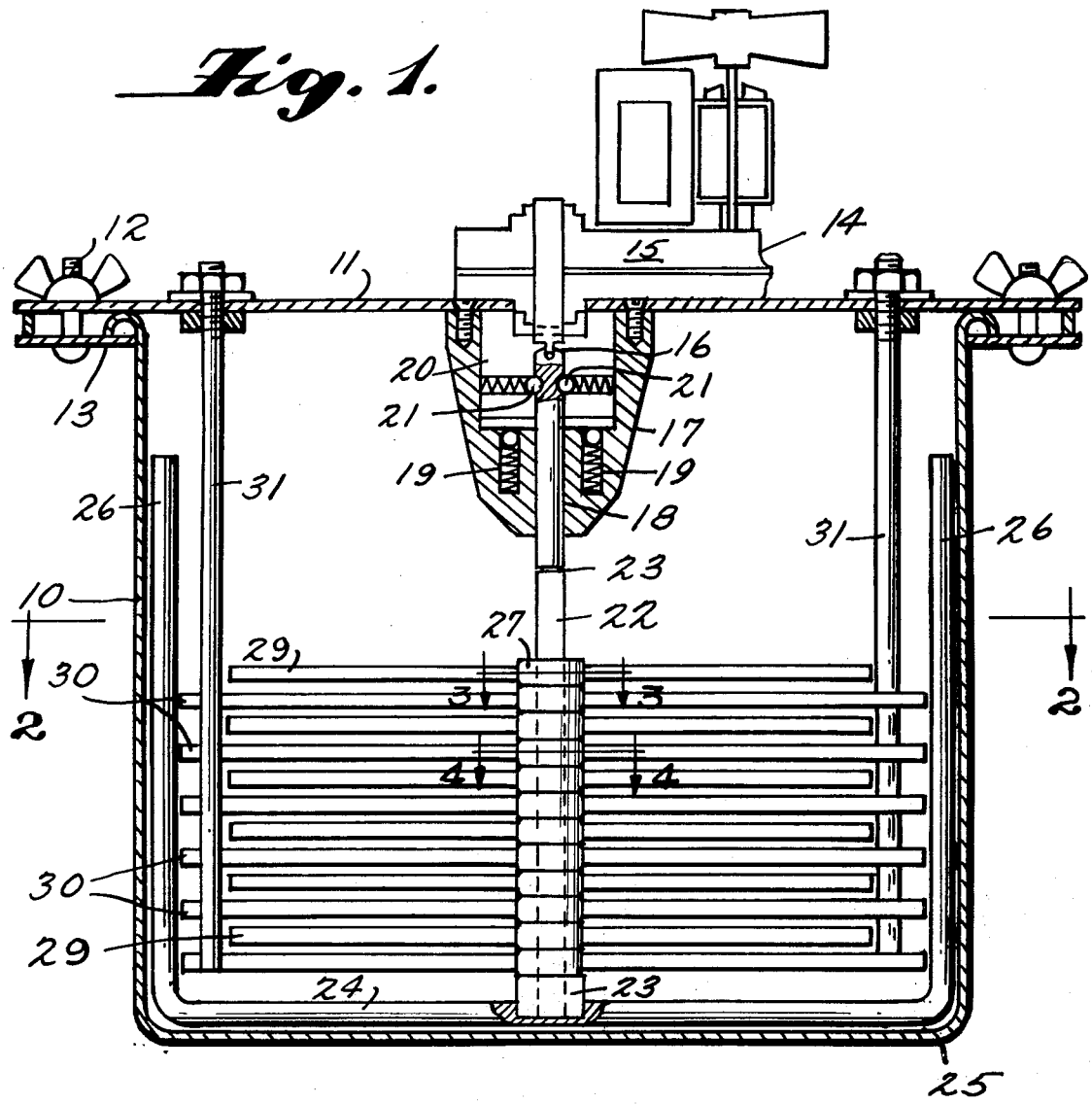
FIG. 1 is a vertical sectional view of apparatus embodying the principles of the present invention.

Referring to FIG. 1, there is shown a cooking vessel 10 having a removable top closure 11 which is held securely to the vessel 10 by wing nut and bolt 12 and washer 13. A motor drive and gear means 14 rests on the top closure 11. The assembly 14 includes a vertical drive shaft 15 extending through an opening in top closure 11 and terminating in a downwardly facing key means 16.

A mounting unit 17 is attached to the underside of the closure 11 for providing a driving connection between the motor shaft 15 and a mixing assembly in the vessel 10. A vertical bore 18 having an enlarged diameter at its upper end extends through the unit 17. A rotating connector block 20 having a vertical bore is disposed in the upper enlarged portion of the bore 18, and a plurality of wells fitted with springs and balls 21 open into the bore of the block 20. The drive shaft 15 projects downwardly into the bore of the block 20.

A central shaft 22 is received in the bore 18 of mounting unit 17 and in the bore of the block 20. The upper end of the shaft 22 is provided with a slot which engages the key means 16 on the drive shaft 15. The portion of the shaft 22 which is disposed within the mounting unit 17 has a circular cross-sectional shape. Below the point denoted by numeral 23, the shaft 22 is of a square cross-sectional shape. The shaft 22 is removably retained in unit 17 and block 20 by the spring-loaded balls 21 which engage an annular groove in the shaft 22.

Shaft 22 extends downward to a terminal hub 23 which is attached thereto. Secured to terminal hub 23 is a horizontal bar 24 which extends radially in opposite directions from hub 23 toward the side walls of vessel 10. Bar 24 is located within close proximity to the bottom 25 of vessel 10. Both end portions of bar 24 are bent into upright sections 26 at a point in close proximity to the side walls of vessel 10 and the upright sections 26 extend vertically in close proximity to the side walls 10.

The drive shaft 15 of the motor and gear means 14 drives shaft 22 in rotational motion and in turn the bars 24 and extensions 26 rotate with shaft 22. The horizontal section of bar 24 passes over the bottom 25 of cooking vessel 10 in close relationship, thus preventing sticking or burning of the sauce on the bottom 25 of vessel 10. Likewise, the upright portions 26 of bar 24 rotates in close proximity to the side walls of vessel 10 thereby preventing sticking or burning of the sauce on the sidewalls.

Figure 3:
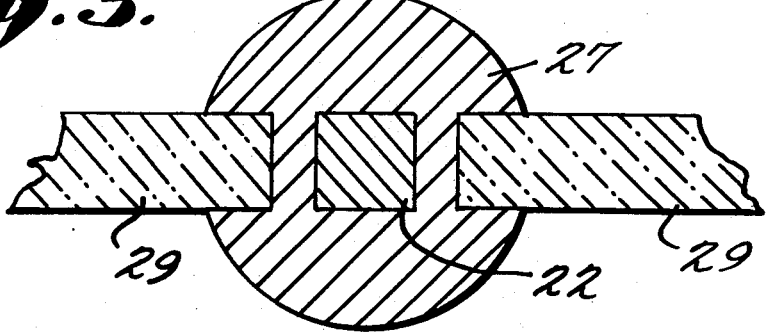
FIG. 3 is a cross-sectional view taken along line 3—3 of FIG. 1.
Figure 4:
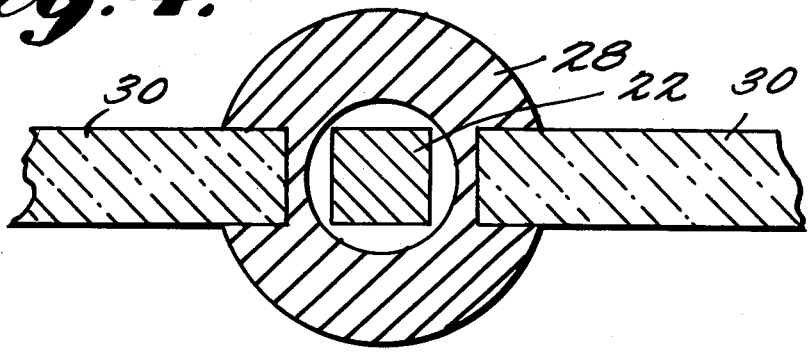
FIG. 4 is a cross-sectional view taken along line 4—4 of FIG. 1.

A plurality of hub members 27 and 28 are stacked one on top of the other and in coaxial arrangement with respect to shaft 22. The hub members include a set of members 27 which have square openings as shown in FIG. 3. The square opening in the hub members 27 receive the square shaft 22, and as shaft 22 rotates, the hub members 27 also rotate. The other set of hub members 28 have circular openings therein as shown in FIG. 4. The circular openings in the hub members 28 are large enough to allow the square shaped shaft 22 to freely rotate therein.

Two elongated horizontal members 29 are attached to each hub 27 and extend radially in opposite directions from the hub. These extensions rotate with hubs 27. Two similar elongated members 30 are attached to each hub 23 and extend radially and in opposite directions from hubs 28. The elongated members 30 are slightly longer than the elongated members 29. The elongated members 30 extend to within close proximity to the upright portion 26 of bar 24 without obstructing the rotation of bar 24. Two vertical elongated members 31 are attached to top closure 11 and extend downward into vessel 10 at a radial location from shaft 22 that the tip ends of elongated members 30 extend beyond the vertical members 31. The tip ends of elongated members 29 clear vertical members 31 so as to be rotatable about shaft 22. In operation, shaft 22 drives hubs 27 in rotational movement which in turn drive elongated members 29 in rotational movement about shaft 22. Elongated members 30 and their associated hubs 28 are not driven by shaft 22, as shaft 22 rotates freely in hubs 28, however, the viscous drag of the sauce being cooked will force elongated members 30 into contact with vertical members 31 which prevents further movement of elongated members 30.

The shear action created between the alternating moving and stationary elongated members 29 and 30 acts to granulate the ground meat component of the sauce being cooked as well as to impart eddy currents in the sauce which aids in developing an excellent degree of bulk mixing of the sauce in the cooking vessel.

Figure 2:
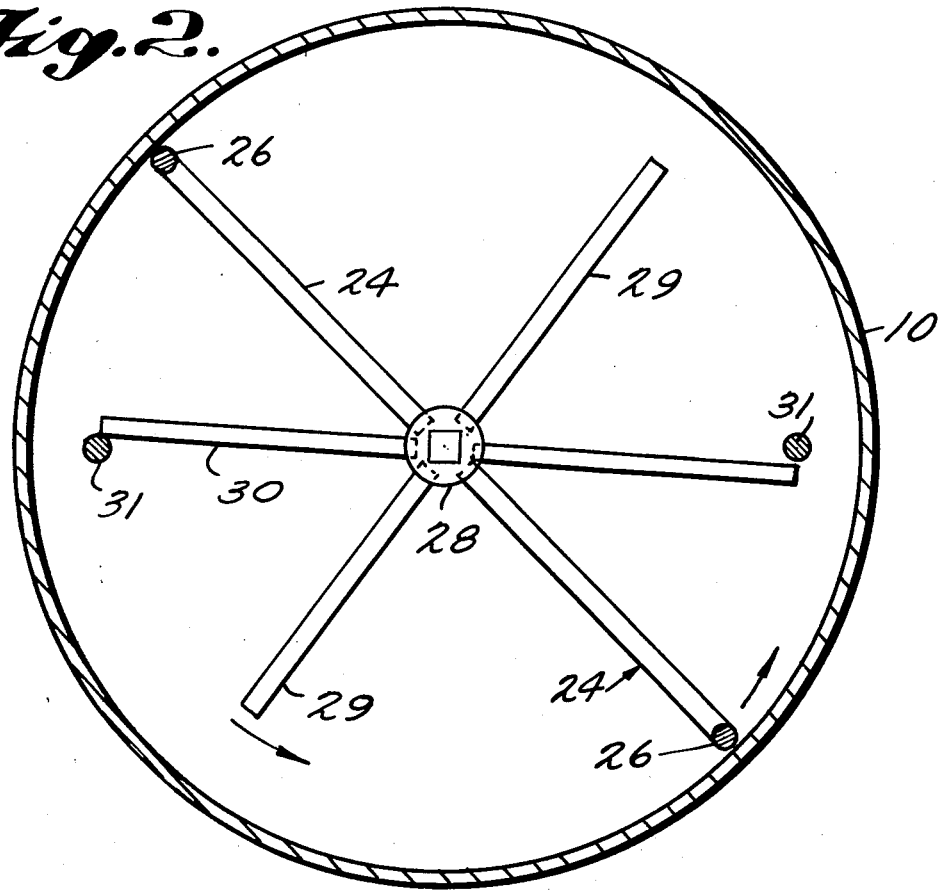
FIG. 2 is a cross-sectional view taken along line 2—2 of FIG. 1.

In FIG. 2, it can be seen that the elongated elements 30 all line up in a vertical plane, and for the mode shown all elongated elements 29 and hubs 27 are arranged on shaft 22 so that the elongated elements 29 are all in a vertical plane which rotates about an axis through shaft 22. The apparatus of the present invention is not limited to such an arrangement however. The elongated members 29 and hubs 27 could be arranged on shaft 22 whereby the elongated members would lie in 2 vertical planes at 90° with each other with both planes revolving about the axis through shaft 22. In addition, additional sets of vertical members 31 could be added around the vessel at the same radial distance from shaft 22 whereupon some of the elongated members 30 could be situated to come into contact with the additional set of elongated members. If two more vertical members 31 were added, the elongated members could be made to form two vertical planes with the angle between these planes being determined by the placement of the additional vertical members 31.

As can be seen from the drawings, the cooking appliance of the present invention can be disassembled quickly and effortlessly. The motor and drive means 14 is removed and then wing nuts 12 are removed whereupon the top closure 11, mounting unit 17 and its associated parts, rotatable shaft 22, bar 24 with upright sections 26 hubs 27 and 28 and associated horizontal elongated members 29 and 30 can be removed from the vessel 10 as a single unit. The rotatable shaft 22 is then removed from mounting unit 17 against the detent action of the spring-loaded balls 21, and the hubs and horizontal elongated members are then free to slide from the free end of shaft 22. Reassembly of the appliance is simply the reverse of the above method.

Figure 5:
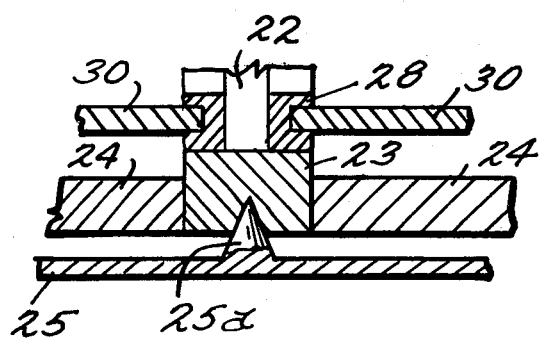
FIG. 5 is a partial cross section of an alternative arrangement for the center rotating shaft and the bottom of the cooking vessel.

A further modification to the support mechanism for the shaft 22 hubs 27 and 28 and mixing components 29 and 30 is shown in FIG. 5. In FIG. 5, the bottom 25 of the cooking vessel has integrally attached thereto a stabilizing pin 25a. The stabilizing pin 25a is located directly under rotating shaft 22 and engages a suitably shaped opening in hub 23. Such an arrangement prevents lateral movement of shaft 22 and in addition supplies additional support for shaft 22 and the assembly of hubs and mixing bars associated with shaft 22.

Two systems have been exemplified for supporting shaft 22 in the above description, i.e., supported from the top of the cooking apparatus and supported from the bottom. It should be realized that these systems for supporting shaft 22 and the associated mixing com-

What is claimed is:

1. A cooking appliance, comprising, in combination, a cooking chamber having cylindrical side walls, a removable top closure and an integral bottom section; a rotatable shaft located coaxial with said cylindrical side walls, said rotatable shaft being removably fixed at one end to drive means mounted on said top closure; a horizontal bar attached to the end of said rotatable shaft next to the bottom section of said cooking chamber, whereby said horizontal bar rotates with said rotatable shaft, said bar extending radially in opposite directions from said rotatable shaft towards said cylindrical side walls of said cooking chamber, said horizontal bar being in close proximity and parallel to said bottom section of said cooking chamber; a pair of vertical bars attached to the ends of said horizontal bar, whereby said vertical bars rotate with said horizontal bar, said vertical bars extending upward from the end of said horizontal bar parallel and in close proximity to said cylindrical side walls; at least one elongated vertical member having one end thereof attached to said top closure, said elongated vertical member extending downwardly with the other end thereof clearing said horizontal bar near the bottom section of said cooking chamber, said elongated vertical member located near the cylindrical side wall of said cooking chamber with sufficient clearance between said cylindrical side wall and said elongated vertical member whereby said rotating vertical bars can pass therebetween; a set of hubs having a central opening and being stacked one upon the other in coaxial arrangement along said rotatable shaft, said set of hubs comprising first hub members which rotate with said rotatable shaft alternatively positioned along said rotatable shaft with second hub members through which the rotatable shaft can freely rotate; at least one elongated horizontal member integrally attached to each of said first and second hub member, said elongated horizontal members extending radially towards the cylindrical walls of said cooking chamber, said elongated members which are attached to said second hub members extend radially just beyond said elongated vertical member attached to said top closure so as to clear said rotating vertical bars, said elongated members attached to said first hub members extend radially so as to clear said elongated vertical member attached to said top closure.

2. A cooking appliance as claimed in claim 1 wherein said rotatable shaft has a square cross-sectional shape, said first hub members have a square central opening of a similar size to the cross-section of said rotatable shaft and said second hub members have a circular central opening large enough for said rotatable shaft to turn freely therein.

3. A cooking apparatus comprising: a vessel having cylindrical side walls; a rotatable, vertical mixing shaft within said vessel; a plurality of hubs slidably stacked on said shaft, alternate hubs cooperating with said shaft so as to be rotatable therewith and the other hubs being constructed so that said shaft turns within them; at least one mixing bar fixed to an d extending horizontally from each hub; stationary means within said vessel supporting the outer ends of those bars carried by said other hubs; a driven shaft supported coaxially above said mixing shaft; and releasable coupling means between said driven shaft and said mixing shaft.

4. A cooking apparatus as claimed in claim 3 wherein a U-shaped mixing member is attached to the end of said rotatable shaft near the bottom of said vessel, said U-shaped mixing member being in near proximity of the bottom and side walls of said vessel with the upright sections of the U-shaped member clearing the ends of said mixing bars attached to said hubs on said rotatable shaft.

* * * * *